Figure 1:
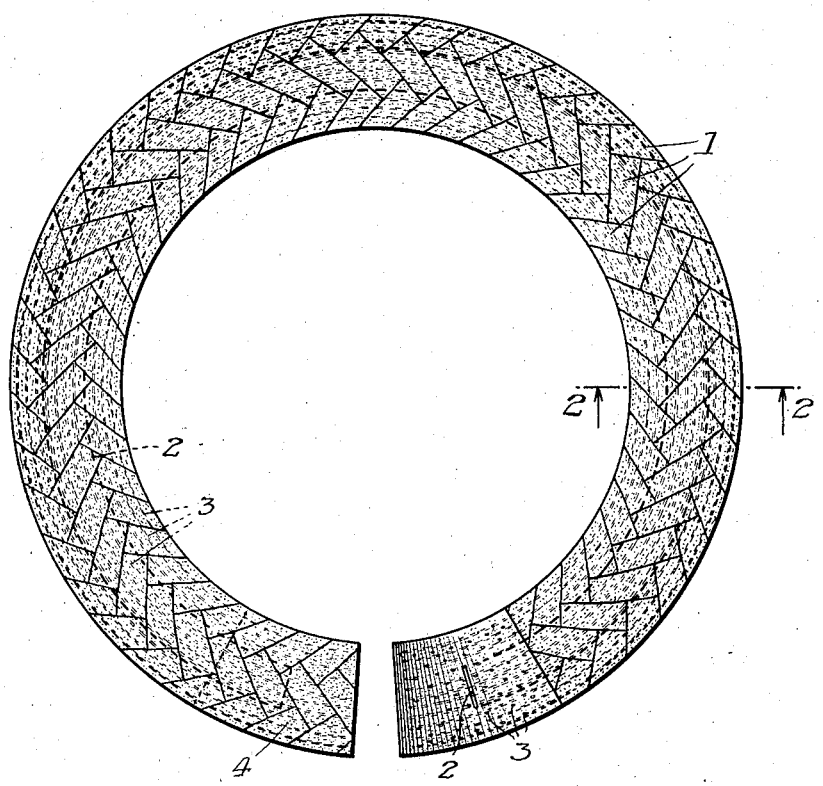

Nov. 12, 1935.  J. P. MAGOS ET AL  2,020,844

PACKING

Filed Feb. 2, 1933

Inventors:
John P. Magos and
Malcolm W. McRae
By Wilson, Dowell, McCanna & Lorch
Attys Witness:
R. B. Davison Patented Nov. 12, 1935

2,020,844

UNITED STATES PATENT OFFICE 2,020,844

PACKING

John P. Magos and Malcolm W. McRae, Chicago, Ill., assignors to Crane Co., Chicago, Ill., a corporation of Illinois Application February 2, 1933, Serial No. 654,895

3 Claims. (Cl. 154—45.5)

This invention relates to packings particularly suited for high pressure and temperature service and its purpose is to provide a packing suitable for this service which inhibits and eliminates electrolytic corrosion of the stem being packed and the stuffing box surrounding the packing and stem.

In high temperature and pressure service it is desirable, if not necessary, to use alloy stems and shafts in order to provide the necessary strength and to resist the corrosive and erosive actions. In many instances the so-called stainless steels are used for the stems and shafts. It has also been customary to use packings composed of asbestos yarns woven about a lead core and having copper or brass reinforcing wires incorporated therein and fibers being impregnated with a lubricant and coated and/or impregnated with a powdered graphite.

Such packings, however, particularly when used in high pressure and temperature service such as is prevalent in the oil and other industries, have proven unsatisfactory, particularly because they are very active electrolytically, causing electrolytic corrosion of the stems and packing boxes.

Corrosion of this type has also been experienced during the period in which the article is stocked and prior to being placed in actual service. Any device, such as a valve for example, utilizing a stuffing box, is generally subjected to a hydraulic test before being placed in stock, and as a result a quantity of moisture remains in the stuffing box in contact with the stem and the packing. If the packing contains materials that are electro-positive with respect to the stem metal, accelerated corrosion of the stem may be expected.

In accordance with this invention the packing fibers are reinforced, lubricated, and impregnated with materials which inhibit and/or eliminate electrolytic corrosion upon the stem and stuffing box surface.

Figure 2:
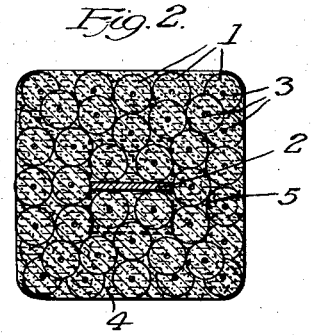

One embodiment of our invention is illustrated in the drawing, in which:

Fig. 1 is a plan view of a packing ring formed in accordance with this invention; and Fig. 2 is a vertical transverse section through the ring taken approximately on line 2—2 of Fig. 1.

In the specific embodiment of this invention illustrated the packing comprises asbestos yarn 1 woven about a center core strip 2 of zinc, or any other metal electro-negative with respect to the stem material. Interwoven with the yarn are zinc wires 3. The entire packing is impregnated with any suitable lubricant indicated in the drawing by the cross-sectional lines 4 and is also impregnated and coated with powdered mica, soapstone, or any other electrolytically inactive material indicated in the drawing by the dots 5.

The zinc core and zinc reinforcing wires are electro-negative with respect to various metals, particularly ferrous stem metals, and, therefore, any electrolytic action which may occur will take effect on the zinc wires and core, thus protecting the stem. It has been found, however, that the action of the zinc substantially eliminates and inhibits any detrimental electrolytic action whatever on the stem at the expense of the zinc.

The resultant effect of the combination of the lubricant and the powdered mica with which the packing is preferably thoroughly impregnated and coated, is to provide better lubrication, permitting relative movement between the fibers and reinforcing wires, and creating more resiliency and flexibility to the packing as a whole.

It will be obvious to those skilled in the art that the shape and cross-section of the packing may be varied and that other variations and modifications may be made upon the specific form of packing shown without departing from the spirit and scope of the invention as defined in the following claims.

We claim:

1. A packing for use as a rod packing comprising a body of woven yarn having interspersed reinforcing wires and a metalic core on which said body is fabricated, said packing adapted to be packed in a stuffing box around a rod extending therethrough, said wires and core being of zinc, and said body being impregnated and coated with powdered mica, said body being also impregnated with lubricating grease providing a vehicle for the powdered mica.

2. A packing for use as a rod packing comprising a body of woven yarn having metallic reinforcing elements distributed therein, said packing adapted to be packed in a stuffing box around a rod extending therethrough, the metallic parts of said packing being of zinc, and said body being impregnated and coated with powdered mica, said body being also impregnated with lubricating grease providing a vehicle for the powdered mica.

3. In a stuffing box comprising in combination a rod and an annularly formed stuffing box surrounding a portion of said rod, a rod packing comprising a body of woven yarn having interspersed reinforcing wires and a metallic core on which said body is fabricated, said packing adapted to be packed in said stuffing box around said rod, said wires and core being of a metal which is electronegative to both the said rod and stuffing box, the said fabricated body being impregnated and coated with a powder consisting of electrolytically inactive material, said body also being impregnated with lubricating grease serving as a vehicle for said powder.

JOHN P. MAGOS.
MALCOLM W. McRAE.